United States Patent
C. R. et al.

(10) Patent No.: US 9,977,477 B2
(45) Date of Patent: May 22, 2018

(54) ADAPTING OPERATING PARAMETERS OF AN INPUT/OUTPUT (IO) INTERFACE CIRCUIT OF A PROCESSOR

(71) Applicant: Intel Corporation, Santa Clara, CA (US)

(72) Inventors: Sunil Kumar C. R., Bangalore (IN); Aruna Kumar, Bangalore (IN); Prakash K. Radhakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 14/497,476

(22) Filed: Sep. 26, 2014

(65) Prior Publication Data
US 2016/0091941 A1    Mar. 31, 2016

(51) Int. Cl.
G06F 1/32    (2006.01)
G06F 1/26    (2006.01)

(52) U.S. Cl.
CPC .......... *G06F 1/266* (2013.01); *G06F 1/3225* (2013.01); *G06F 1/3243* (2013.01); *G06F 1/3293* (2013.01)

(58) Field of Classification Search
CPC ..... G06F 1/32; G06F 1/26; G06F 1/28; G06F 1/00; G06F 9/44
USPC ....... 713/300, 310, 320, 321, 322, 323, 324, 713/330, 340, 375
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Phil Nguyen
*Assistant Examiner* — Keshab Pandey
(74) *Attorney, Agent, or Firm* — Trop, Pruner & Hu, P.C.

(57) ABSTRACT

In an embodiment, processor includes at least one logic circuit to generate information to be output from the processor; an input/output (IO) interface circuit coupled to the at least one logic circuit to receive and transmit the information; a voltage regulator to provide an operating voltage to the IO interface circuit; and a controller to control the voltage regulator to provide the operating voltage at an adjusted level from a nominal operating voltage based on a process variation of at least a portion of a die including the IO interface circuit. Other embodiments are described and claimed.

16 Claims, 15 Drawing Sheets

(56) References Cited

U.S. PATENT DOCUMENTS

| | | | |
|---|---|---|---|
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,362,642 B2* | 1/2013 | Zerbe | G06F 1/26 307/43 |
| 8,689,023 B2* | 4/2014 | Gupta | G05F 1/575 713/300 |
| 9,492,056 B2* | 11/2016 | Lovisotto | H02J 9/005 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0237970 A1* | 9/2009 | Chung | G11C 5/02 365/51 |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2012/0293195 A1* | 11/2012 | Bourstein | G01R 31/31721 324/750.01 |
| 2013/0007427 A1* | 1/2013 | De Angelis | G06F 3/04895 713/1 |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0169262 A1* | 7/2013 | Hartman | H02M 3/1584 323/351 |
| 2013/0214380 A1* | 8/2013 | Malek-Khosravi | H01L 27/04 257/499 |
| 2014/0068290 A1 | 3/2014 | Bhandaru et al. | |

OTHER PUBLICATIONS

SPEC-Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.
International Application No. PCT/US2012/028876, filed Mar. 13, 2012, entitled "Dynamically Computing an Electrical Design Point (EDP) for a Multicore Processor," by Intel Corporation.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

* cited by examiner

ADAPTING OPERATING PARAMETERS OF AN INPUT/OUTPUT (IO) INTERFACE CIRCUIT OF A PROCESSOR

TECHNICAL FIELD

Embodiments relate to control of an input/output interface circuit.

BACKGROUND

High speed serial input/output interface circuits (HSIOs) can play a major role in integrated circuits such as processors or systems on chip (SoC), as HSIOs collectively are the key interfaces that enable primary user experience and interface to external data access. Oftentimes during design there are competing considerations relating to high performance IO, namely the desire to operate such interfaces at low power and the desire to enable high speed operation for maintaining and increasing performance. Thus a design may have tradeoffs made for these considerations, which can lead to less than desirable operating characteristics.

DETAILED DESCRIPTION

Figure 1:
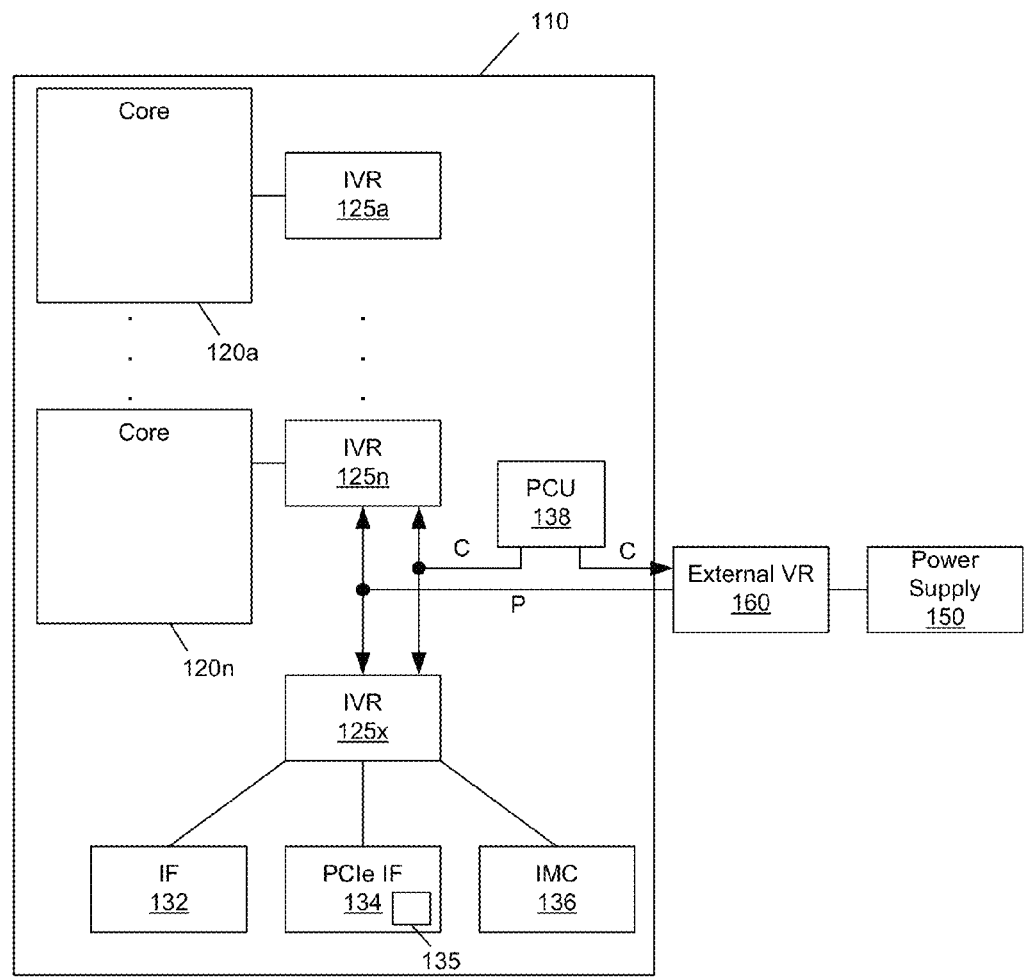
FIG. 1 is a block diagram of a portion of a system in accordance with an embodiment of the present invention.

In various embodiments, one or more operating parameters of a voltage regulator, such as a low dropout (LDO) regulator of a processor, SoC or other integrated circuit (IC), can be controlled based on detection of process variation of a given semiconductor die that forms the device. More specifically, based on active measurements of process variation, operating voltage can be controlled in a manner to efficiently balance power consumption and performance. For example, when a slower semiconductor (e.g., silicon) die is determined to be present, voltage can be increased (e.g., from a nominal level), and similarly in the case of a faster semiconductor die, voltage can be lowered (e.g., from a nominal level) to reduce power consumption, without affecting performance. Using an embodiment, corner conditions such as a slow silicon-low voltage performance critical corner and a fast silicon-high voltage corner do not occur in operation.

Once an initial optimal voltage setting is determined using a process in accordance with an embodiment, in order to make it more robust, a near end loop back test operation may be performed to determine suitable performance in a data path of the device. In this way, data integrity is verified in a high speed path, and if there is a failure during this loop back operation, the initial optimal voltage may be adjusted (e.g., using a different (lower or higher voltage).

Using an embodiment, the design overhead, area and validation to meet extreme process corners can also be optimized, thereby improving time to market, along with area and power reductions. Embodiments thus provide a voltage rail monitor that encompasses four challenges in SoC intellectual property (IP) designs (power, performance, time to market (TTM) and wide process variation in sub-nanometer designs). In this way, a process adaptable IO logic is provided for SoCs and other ICs. As such, an IO logic need not be designed to meet a wide variety of process and voltage extreme corners, enabling optimal power, area and performance. In contrast, without an embodiment, a sub-nanometer process technology design may need to be revisited multiple times, which can lead to multiple iterations of circuit re-design.

Embodiments seek to determine and provide an optimal voltage setting during runtime based on process skew and near end loop back (NELB) data. A tuning algorithm may be performed using a process monitor circuit to controllably vary the LDO voltage output from a nominal value (Vnom), which may be a configuration value stored in a given configuration storage. Based on process variation measurements made responsive to varying this voltage, if the die is determined to be of a slow process variation, the LDO increases the voltage in a manner to increase performance. Similarly, if the die is determined to be of a fast process variation, the LDO decreases the voltage in a manner to reduce power consumption. During execution of the tuning algorithm, additional circuitry, namely a loop back circuit may be configured to confirm functionality, as a check to verify correct functionality and proper operation at the given voltage level. In both cases, an optimal LDO voltage may thus be set, without compromising performance.

Although the following embodiments are described with reference to operating voltage control and energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In other embodiments, each interface may include or be associated with its own voltage regulator. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007). As will be described herein, an operating voltage for one or more of these interfaces can be determined dynamically during runtime, based at least in part on runtime-determined process variation information. To this end, interface 134 may include an optimization circuit 135 to perform such operations.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). In some embodiments, the interface voltage optimization may be performed at least in part by logic within PCU 138.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Figure 2:
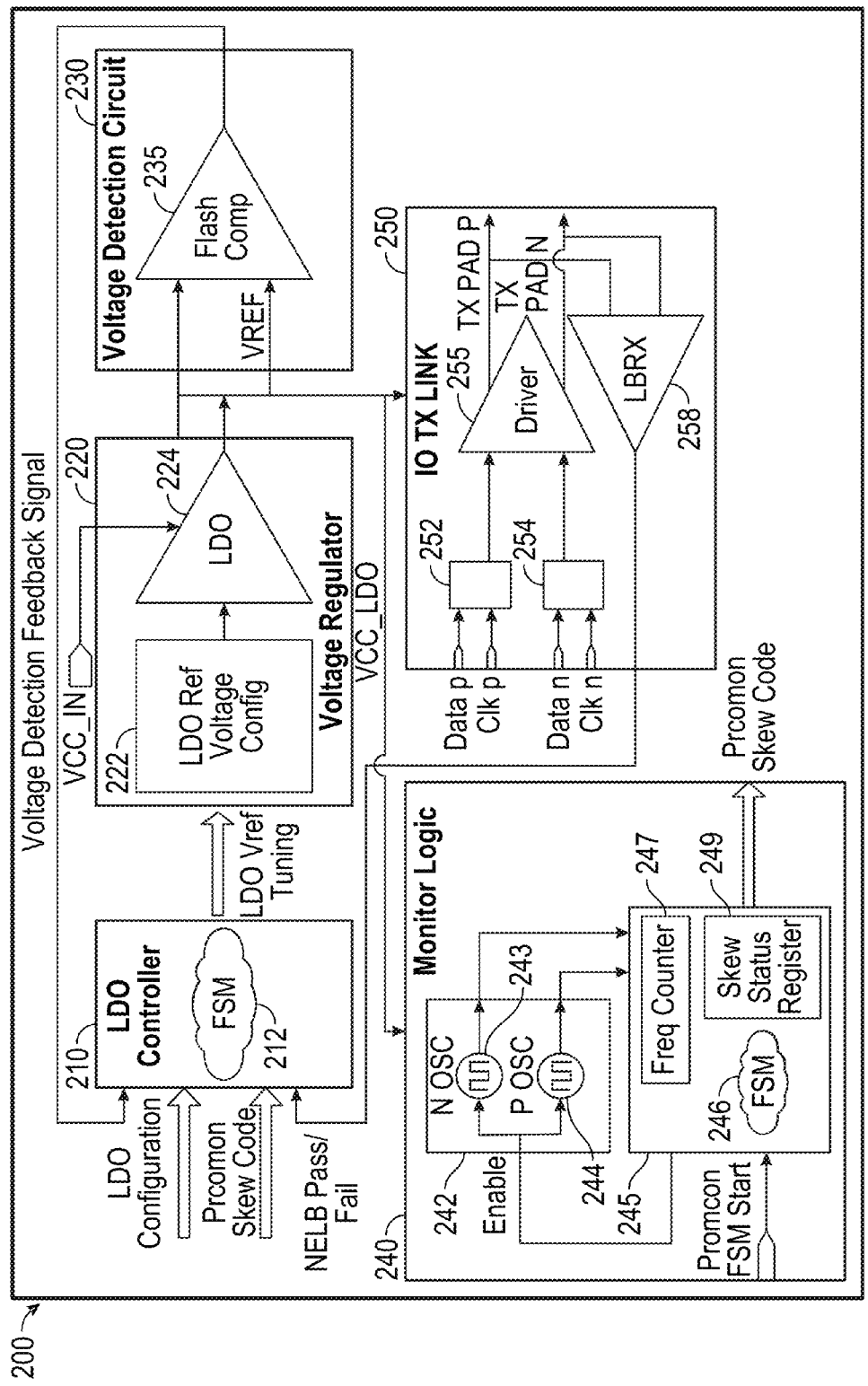
FIG. 2 is a block diagram of a circuit in accordance with an embodiment of the present invention.

Referring now to FIG. 2, shown is a block diagram of a circuit in accordance with an embodiment of the present invention. Circuit 200 includes voltage optimization circuitry, including monitoring circuitry to measure a process variation associated with at least a portion of a semiconductor die such as a silicon die on which an integrated circuit (IC) including circuit 100 is located, and to control a level of an operating voltage based at least in part thereon.

Note that circuit 200 includes, in addition to voltage optimization circuitry, at least portions of an input/output (IO) interface circuit 250 that provides an interconnection between one or more intellectual property (IP) blocks or logic of the IC and one or more off-chip connections such as an interconnect that couples the IC to another component such as another IC, a network connection, a wireless interface, a display interface or so forth. Thus as seen in FIG. 2, at least a portion of IO interface circuit 250 is present that provides an IO interface between one or more logic blocks of the IC (not shown for ease of illustration in FIG. 2) and one or more off-chip connections such as a differential pad pair, in the instance shown in which IO interface circuit 250 is a serial interface such as a high speed serial interface. Understand that while the main transmit path is shown in FIG. 2, a receiver path also may be present to receive, process, and provide incoming information to a given consuming logic.

With reference to IO interface circuit 250, incoming data from one or more logic blocks and corresponding clock information is received in a pair of buffer circuits (e.g., implemented as D-type flip flops 252, 254) and in turn in a driver circuit 255 that acts as an analog front end to communicate serial transmit information (TX PAD P/TX PAD N), which may be provided to an off-chip destination. As further seen, IO interface circuit 250 includes a receiver 258 configured to be a loop back receiver which, as will be described herein can be used for performing near end loop back tests during voltage optimization operations in accordance with an embodiment. At a high level, receiver 258 receives the to-be transmitted signals and processes them to generate a pass/fail signal. Note that receiver 258 may be part of design for X (DFx) circuitry of the IC.

Still referring to FIG. 2, circuit 200 further includes a voltage regulator 220 which in an embodiment is a LDO regulator formed of a voltage configuration logic 222 and a LDO 224 configured to receive an incoming supply voltage VCC_IN which may be received from an external voltage regulator. Thus as shown in FIG. 2, voltage regulator 220 is an on-die voltage regulator. Note that a given IC may include a number of on-die regulators, and in the embodiment shown voltage regulator 220 is the voltage regulator for IO interface circuit 250 and related circuitry. In particular embodiments, each IO interface circuit of an IC may include or be associated with its own voltage regulator. Also understand the scope of the present invention is not limited to on-chip regulators and in other embodiments, an off-chip voltage regulator may be a source of an operating voltage. The regulated voltage output by regulator 220 is provided to all of a voltage detection circuit 230, IO interface circuit 250, and a monitor logic 240.

In general, voltage detection circuit 230 is configured to compare the voltage output by voltage regulator 220 to a reference voltage (VREF) and provide a comparison output as a voltage detection feedback signal from a comparator 235 to an LDO controller 210. In general, LDO controller 210 is configured to control the operating voltage to be output by voltage regulator 220 by generation of an LDO reference voltage tuning value provided by a finite state machine (FSM) 212 of controller 210. As seen, LDO controller 210 further receives, in addition to the voltage detection feedback signal, an LDO configuration signal and a skew value. In general, the LDO configuration signal provides a nominal voltage. In turn, the skew value corresponds to an indication of a level of process variation associated with at least the portion of the semiconductor die in which circuit 200 is formed.

As described further herein, this skew value may be generated by monitor logic 240. Based on pre-silicon design data (which may be based on simulation results or other empirical data), thresholds can be set to classify a given die portion as being of one of multiple process variations. In a simple example described herein, process variations of a die may be set to one of three levels: FAST, TYPICAL and SLOW silicon. However understand the scope of the present invention is not limited in this regard and in other examples more than three levels of variation may be identified.

Still referring to FIG. 2, monitor logic 240 is a process monitor having an oscillator 242 which in the embodiment shown is a ring oscillator to generate a test frequency based on a received clock signal. Of course, other types of process monitor circuits may be used such as CMOS ring oscillators. In the embodiment of FIG. 2, oscillator 242 is formed of a plurality of N-stage inverters 243, 244, respectively formed of p-channel metal oxide semiconductor (pMOS) and n-channel MOS (nMOS) devices to respectively produce a test oscillation frequency based on delay of N number of inverters. If the die of a fast process variation, the device delay will be smaller and oscillation frequency is higher. If the process is slow, the device delay will be slow and hence oscillation frequency is lower.

In general, oscillator 242 is enabled responsive to an enable signal received from a logic unit 245 when a process monitoring operation is to be performed as part of voltage optimization. Specifically, logic unit 245 includes an FSM 246 that enables process monitoring responsive to receipt of an initialization signal which may be triggered responsive to an enabling of corresponding IO interface circuit 250. Responsive to receipt of this signal, FSM 246 initiates the voltage optimization process by first performing process monitoring. In part, this process monitoring may be implemented by triggering operation of oscillator 242. Responsive to this enabling, the oscillators of oscillator 242 operate at a frequency that varies depending on the given process variation. As such, a deviation from a nominal oscillation frequency may be determined with reference to a frequency counter 247. Based on such variation, and with reference to threshold values for determining a given level of process variation as stored in a skew state register 249, a level of process variation can be determined and output from monitor logic 240 as the skew value. Understand while shown at this high level in the embodiment of FIG. 2, the scope of the present invention is not limited in this regard. For example, as described above in other embodiments some or all of the process monitor and voltage control circuits may be implemented in a power controller such as a PCU.

Figure 3:
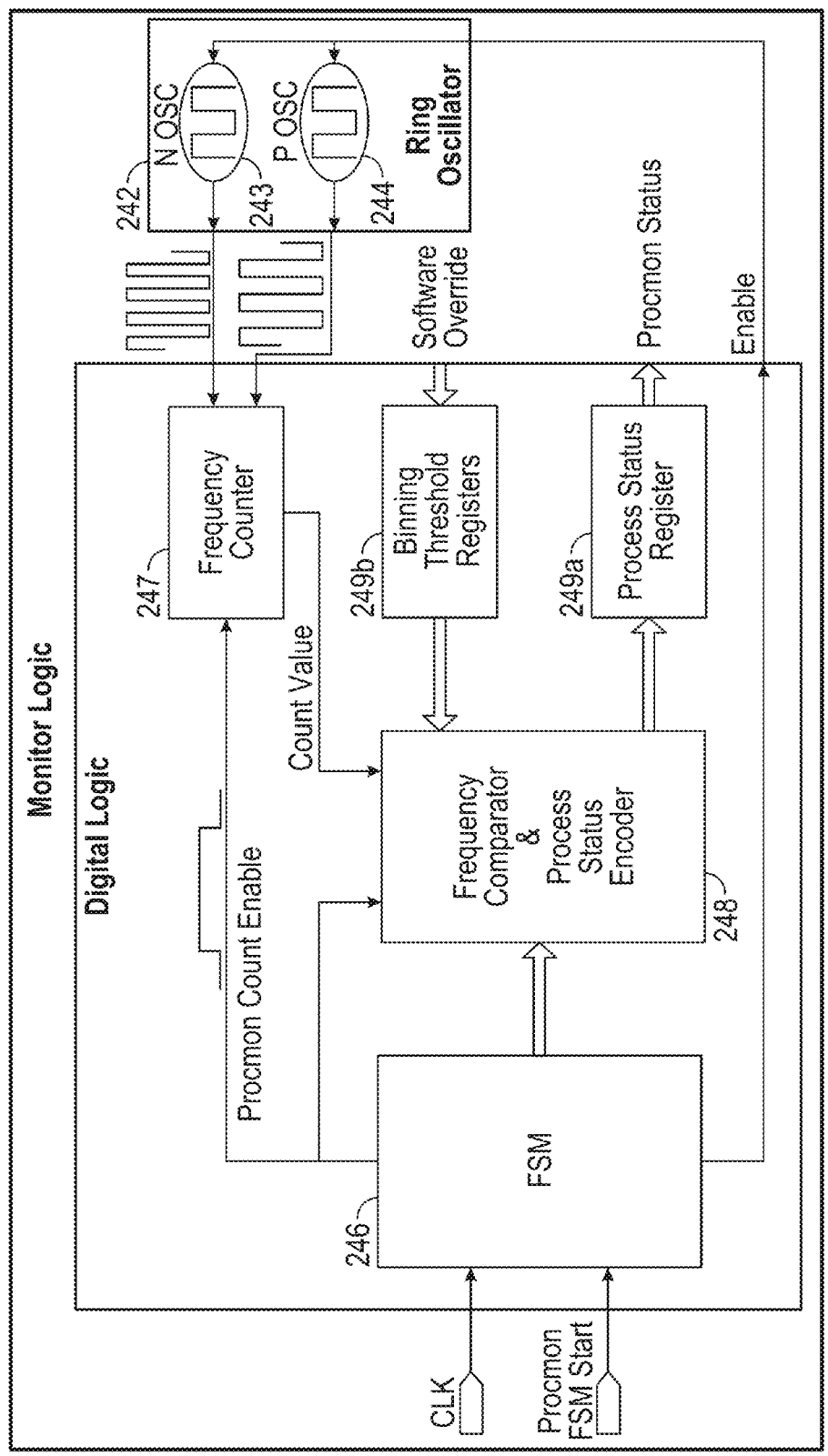
FIG. 3 is a block diagram of further details of a process monitor logic in accordance with an embodiment of the present invention.

Referring now to FIG. 3, shown are further details of a process monitor logic in accordance with an embodiment of the present invention. As shown in FIG. 3, monitor logic 240 includes logic unit 245 having FSM 246 that receives the start signal and a clock signal. When enabled, FSM 246 enables both oscillator 242 and corresponding circuitry including frequency counter 247 and comparator/encoder 248. More specifically, when enabled, frequency counter 247 is configured to maintain one or more count values based on the oscillation signals generated by delay stages or oscillators 243, 244 of oscillator 242. When triggered by FSM 246, frequency counter 247 provides count values to encoder 248, which may compare the count values to corresponding count values received from threshold registers 249b. Based on this comparison, comparator/encoder 248 determines a level of process variation that in turn is encoded and provided to a process status register 249a, which may store the value corresponding to an encoded indication of a process variation associated with circuit 200. In an embodiment, a two bit encoding may be provided according to Table 1:

TABLE 1

| Code | Process Variation |
| --- | --- |
| 00 | SLOW |
| 01 | TYPICAL |
| 10 | FAST |

Of course while shown with this particular implementation in the embodiment of FIG. 3, understand that a process monitoring logic may take other forms in different embodiments.

Figure 4:
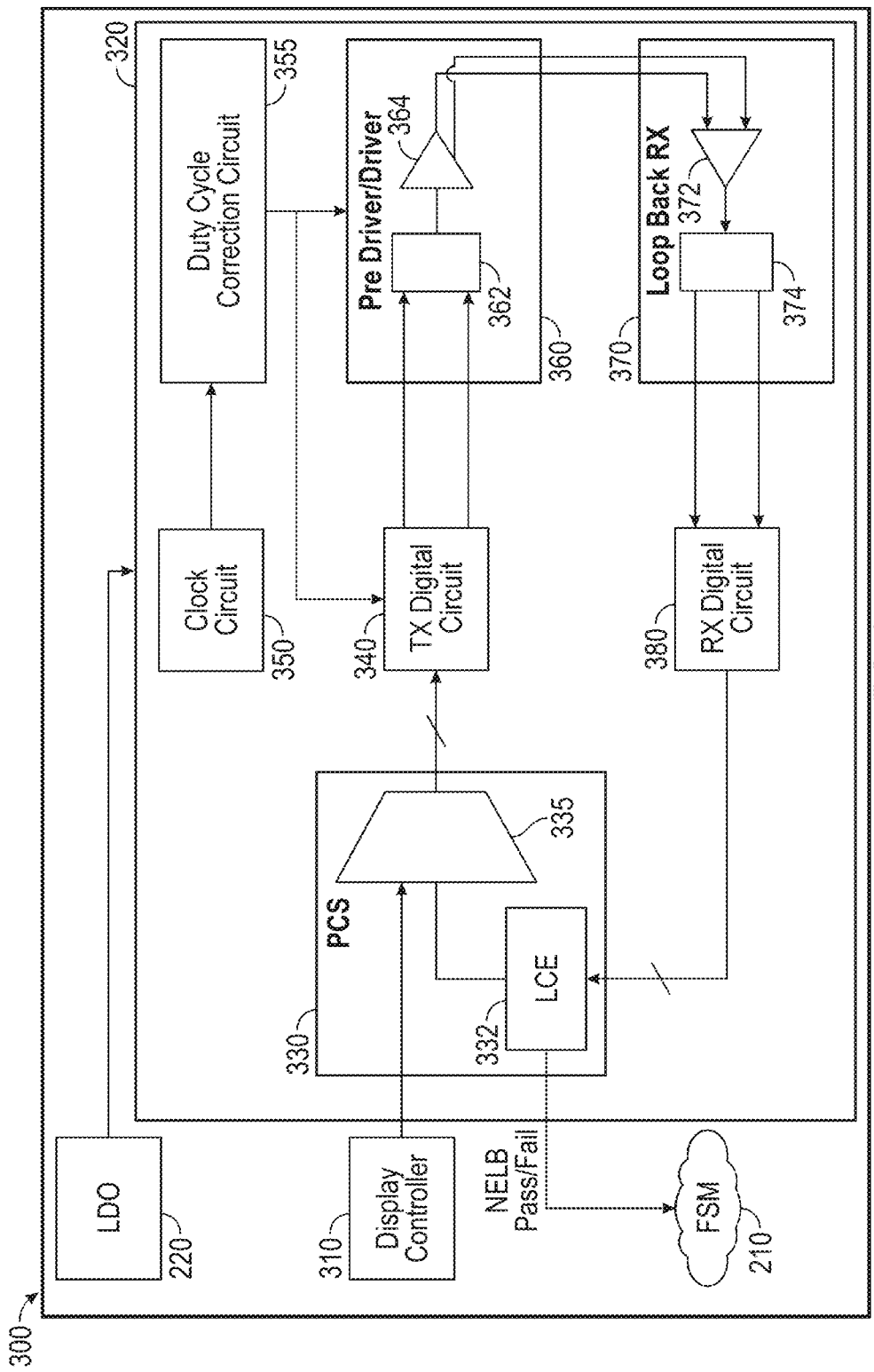
FIG. 4 is a block diagram of a loop back circuit arrangement in accordance with an embodiment.

Referring now to FIG. 4, shown is a block diagram of a loop back circuit arrangement in accordance with an embodiment. As shown in FIG. 4, circuit 300 includes many of the same portions of circuit 200 of FIG. 2. Specifically, LDO 220 is seen, along with IO interface circuit 250. In the embodiment shown, IO interface circuit 250 is associated with a particular IP logic, namely a display controller 310. In general, display controller 310 may be a display control circuit to be associated with a platform display (such as a touchscreen) to which a processor such an SoC is coupled, e.g., via a display port (DP) or other graphics interface. Accordingly, as an example, display controller 310 may provide high speed graphics information for output via IO interface circuit 250 to the associated display.

As seen, an ordinary data path of IO interface circuit 250 includes a physical coding sublayer (PCS) 330 which in an embodiment may be configured as a first in first out (FIFO) buffer to receive and code incoming parallel data, which may take the form of graphics or other display information. Such coded information is routed through a multiplexer 335 which in normal mode is configured to pass this display information. Instead during a voltage optimization process, test data from a local compare engine (LCE) 332 is routed through multiplexer 335. In an embodiment, such test data may be 10-bit wide parallel data transferred at a relatively low speed, e.g., 540 megahertz (MHz). This test data may take the form of a test pattern to be compared against a return from a loop back path (e.g., a near end loop back path). In an embodiment, LCE 332 generates random parallel data for the test pattern.

In either case, the information output by PCS 330 is provided to a transmit digital circuit 340. In an embodiment, circuit 340 includes a parallel in serial out (PISO) circuit, one or more filters such as finite impulse response (FIR) filters, and a retimer to retime the transformed data into an appropriate format such as for high speed transmission. For example, a differential serial output may be provided (having even and odd data) at a higher speed (e.g., 2.7 gigahertz (GHz)), although of course other frequencies are possible. As seen, this high speed serial data is provided to a circuit 360 including a pre-driver 362 and a driver 364 that thus transforms and drives the data off-chip.

As further illustrated, via a loop back path, the same data is provided to a loop back receiver 370 formed of a receiver 372 and a sampler 374. In general, this near end loop back path is a DFX circuit used in high volume manufacturing (HVM) validation to ensure data integrity is correct at a highest speed of operation. As such, this circuitry supports both analog and digital near end loop back, and may operate robustly across process, voltage and temperature (PVT) combinations. Thus the output from loop back receiver 370 is the same data that is driven off-chip. In turn, this loop back information is provided to a receiver digital circuit 380 which, in an embodiment, may include a serial in-parallel out (SIPO) circuit and retimers to transform the data back to its original form (e.g., 10-bit wide parallel data at 540 MHz). As seen, this data is provided to LCE 332, which performs a comparison to determine whether the transmitted information corresponding to the test data is the same as that received via the loop back path. If so, operation at the given voltage is correct and thus a pass signal is sent back to FSM 212. Instead if the information does not match that transmitted, a failure signal is sent. Note further as illustrated in FIG. 4, IO interface circuit 250 further includes a clock distribution circuit 350 and a duty cycle correction circuit 355 to provide appropriate clock signals to transmit digital circuit 340 and pre-driver/driver 360.

In this approach of a tuning algorithm in accordance with an embodiment, voltage detection plays a major role as decisions are made based on voltage level data. To ensure the robustness of voltage detection, a switched capacitor-based comparator and resistor ladder-based voltage reference may be implemented. In an embodiment, to measure the voltage close to the transmitter of IO interface circuit, a driver (e.g., driver 255 of FIG. 2) may be configured as a resistor ladder to obtain VCC/2. In turn, this voltage of the driver may be compared to the reference voltage to determine a voltage level feedback circuit. In this way, IR drop through the power grid is also considered in the detection.

In general, the tuning algorithm proceeds through a plurality of steps, which may be initiated after a given IO circuit including the process monitor circuitry is activated (e.g., powered in advance of upcoming data communication to or from the processor). In a first phase, after the transmitter is powered up, the process monitor circuit is enabled to classify the silicon die as one of a plurality of levels (e.g., TYPICAL, SLOW or FAST). In a second phase, voltage adjustments are made to the LDO based on the classified process variation. Thereafter, a loop back test is performed at the adjusted frequency to determine whether the data integrity is verified. Such operations occur until a failure results, at which point the last voltage having a successful loop back test is selected as the operating voltage for the IO circuit.

Figure 5:
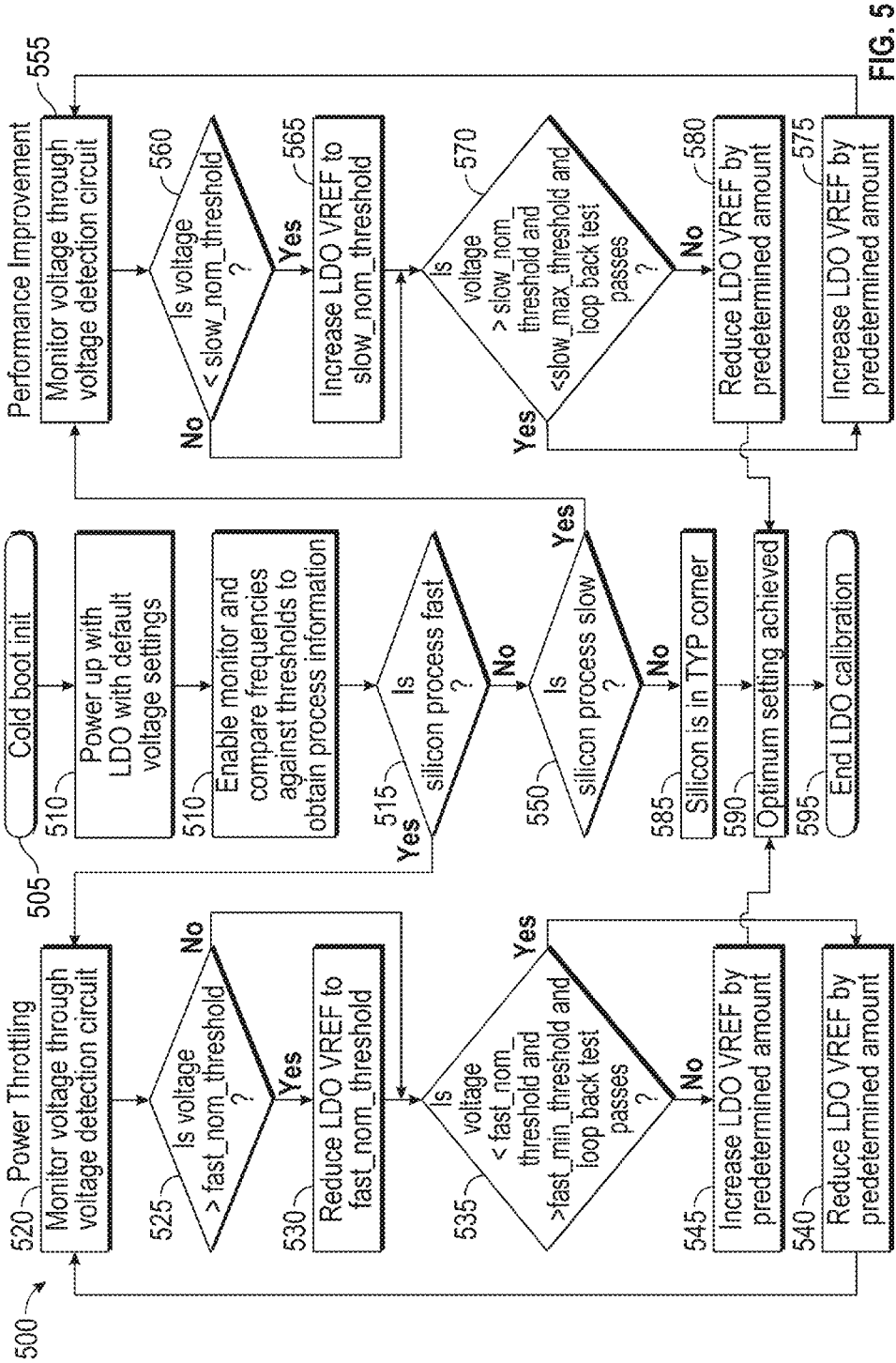
FIG. 5 is a flow diagram of a method in accordance with an embodiment of the present invention.

Referring now to FIG. 5, shown is a flow diagram of a method in accordance with an embodiment of the present invention. As shown in FIG. 5, method 500 may be performed using a voltage optimization circuit such as that of the high level view shown in FIG. 2. However understand that in other embodiments, the method may be performed by other hardware, software and/or firmware of a system. For example, one or more microcontrollers and/or FSMs may be configured to perform all or portions of the method.

As shown, method 500 begins on a cold boot initialization of a given IO interface circuit including an LDO to be controlled as described herein (block 505). Next, control passes to block 510 where the LDO may be powered up with a default voltage setting. Note that this default voltage setting may be obtained from an appropriate configuration storage such as a configuration storage within the voltage optimization circuit. Of course, the configuration value may be obtained from other locations, such as another configuration storage of a platform or a given entity, such as a basic input/output system (BIOS). Next control passes to block 512 where a monitor circuit is enabled and one or more frequencies (e.g., of a test oscillator) are compared against threshold frequencies to determine process information.

Next, it is determined from this process information whether at least the portion of the die in which this circuitry is associated is of a fast process variation (as determined at diamond 515). If so, control passes to block 520 where operations associated with power throttling may begin. Specifically at block 520 a voltage output by the LDO may be monitored via a voltage detection circuit, and from this monitored voltage it is determined whether the voltage is greater than a first nominal threshold (which in an embodiment may be a fast nominal threshold (diamond 525)). If so, control passes to block 530 where the LDO can be controlled to reduce its voltage. More specifically, in an embodiment a reference voltage provided to the LDO may be reduced to in turn reduce the LDO output voltage to this first nominal threshold.

In either case, control next passes to diamond 535 to determine whether the LDO output voltage is between a first minimum threshold (namely a fast minimum threshold voltage) and the first nominal threshold. If so, and further if a loop back test performed at this voltage passes, control passes to block 540 where the LDO voltage may then be reduced, e.g., by a predetermined amount. This predetermined amount may vary in a particular implementation and may be set by configuration, e.g., to 10 or 20 millivolts (mv). Control next passes back to block 520 for a further iteration of this loop. If instead either the voltage is not within the tolerance levels or the loop back test fails, control passes to block 545 where the LDO voltage may be increased, e.g., by the predetermined amount and thus an optimum setting is achieved (block 590) and the LDO calibration of an optimal voltage is completed.

If instead at diamond 515 it is determined that the process is not fast, control passes to diamond 550 to determine whether the process is slow. If so, control passes to block 555 where operations performed in enhancing performance (by increase to the LDO voltage) may begin. More specifically, at block 555 the LDO voltage output is monitored via the voltage detection circuit, and from this monitored voltage it is determined whether the voltage is less than a second nominal threshold (which in an embodiment may be a slow nominal threshold (diamond 560)). If so, control passes to block 565 where the LDO can be controlled to increase its voltage to this slow nominal threshold.

In either case, control next passes to diamond 570 to determine whether the LDO output voltage is between a second maximum threshold (namely a slow maximum threshold voltage) and the second nominal threshold. If so, and further if a loop back test performed at this voltage passes, control passes to block 575 where the LDO voltage may then be increased, e.g., by a predetermined amount (which may be the same 10 or 20 my in this embodiment). Control next passes back to block 555 for a further iteration of this loop. If instead either the voltage is not within the tolerance levels or the loop back test fails, control passes to block 580 where the LDO voltage may be decreased, e.g., by the predetermined amount and thus an optimum setting is achieved (block 590) and the LDO calibration of an optimal voltage is completed.

Still referring to FIG. 5, otherwise if the process is not slow or fast, instead control passes to block 585 where it can be determined that the die is at a typical process level having relatively little variation from nominal levels and as such, no further voltage optimization or calibration may be performed. Understand while shown at this high level in the embodiment of FIG. 5, the scope of the present invention is not limited in this regard.

Embodiments thus seek to reduce power and delay variation that may exist in different products manufactured from die of a common fabrication (and even across wafer variation). More specifically, embodiments may controllably and dynamically adjust operating voltage of IO circuits of a processor or other IC to reduce power consumption in products formed of fast variation silicon die, and similarly to reduce performance loss in products formed of slow variation silicon die. Stated another way, power consumption increase due to higher voltage operation in fast silicon dies may be reduced using embodiments, and similarly performance loss due to lower voltage operation in slow silicon dies also may be reduced.

Still further, embodiments may eliminate certain corner cases of operation. More specifically, a product having a fast silicon die will be optimized to not run at voltages greater than a minimal voltage level (which is less than a nominal voltage level). Similarly, a product having a slow silicon die will be optimized to not run at voltages less than a nominal voltage level. Using an optimized voltage in accordance with an embodiment, reduced jitter also may result.

Embodiments thus provide voltage adaptability over process variation, which, in addition to improving operation of products originating from one or more semiconductor wafers (and thus increasing manufacturing yield), may also reduce time to market as design complexity is also reduced. As to a resulting design, given the ability to optimize voltage during runtime, dynamic power scaling is achieved, leading to reduced area, power reductions (both active power and leakage power), increased data rates (e.g., an IP block designed for 5.4 GBps data transfer can be made to work at 8.1 GBps), and decoupling capacitance requirements can be reduced. Note that active power reductions can be achieved, both due to voltage reduction and design having a narrower PVT range.

Figure 6:
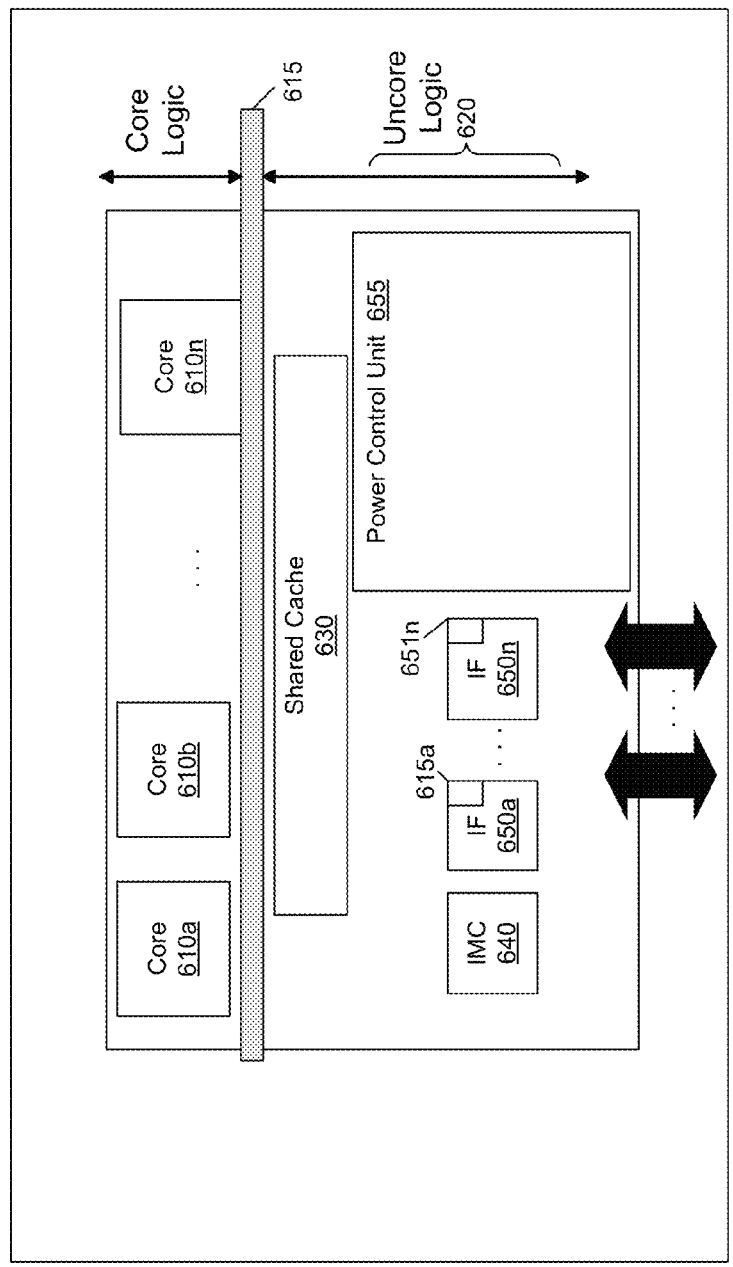
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 600 may be a multicore processor including a plurality of cores $610_a$-$610_n$. In one embodiment, each such core may be of an independent power domain and can be configured to enter and exit active states and/or maximum performance states based on workload. The various cores may be coupled via an interconnect 615 to a system agent or uncore 620 that includes various components. As seen, the uncore 620 may include a shared cache 630 which may be a last level cache. In addition, the uncore may include an integrated memory controller 640 to communicate with a system memory (not shown in FIG. 6), e.g., via a memory bus. Uncore 620 also includes various interfaces 650 and a power control unit 655, which may include logic to perform power management techniques.

In addition, by interfaces 650a-650n, connection can be made to various off-chip components such as peripheral devices, mass storage and so forth. As seen interfaces $650_0$-$650_n$ may include corresponding optimization circuits $651_a$-$651_n$ to dynamically determine an optimal operating voltage for the interface based on process variation information. While shown with this particular implementation in the embodiment of FIG. 6, the scope of the present invention is not limited in this regard.

Figure 7:
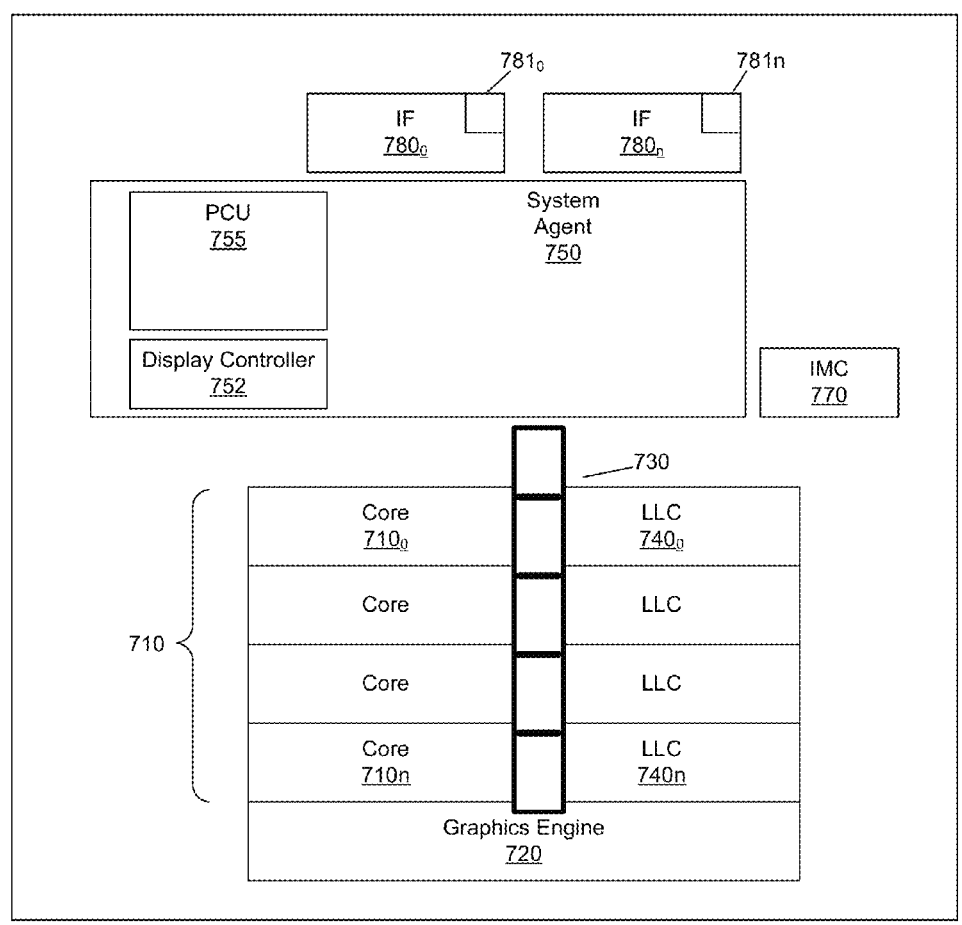
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines, and a system agent domain 750 may further be present. In some embodiments, system agent domain 750 may execute at an independent frequency than the core domain and may remain powered on at all times to handle power control events and power management such that domains 710 and 720 can be controlled to dynamically enter into and exit high power and low power states. Each of domains 710 and 720 may operate at different voltage and/or power. Note that while only shown with three domains, understand the scope of the present invention is not limited in this regard and additional domains can be present in other embodiments. For example, multiple core domains may be present each including at least one core.

In general, each core 710 may further include low level caches in addition to various execution units and additional processing elements. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755 which can include logic to perform power management techniques.

As further seen in FIG. 7, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. As seen, interfaces $780_0$-$780_n$ may include corresponding optimization circuits $781_0$-$781_n$ as described herein to enable dynamic operating voltage control of the interfaces based at least in part on process variation information. Although shown at this high level in the embodiment of FIG. 7, understand the scope of the present invention is not limited in this regard.

Figure 8:
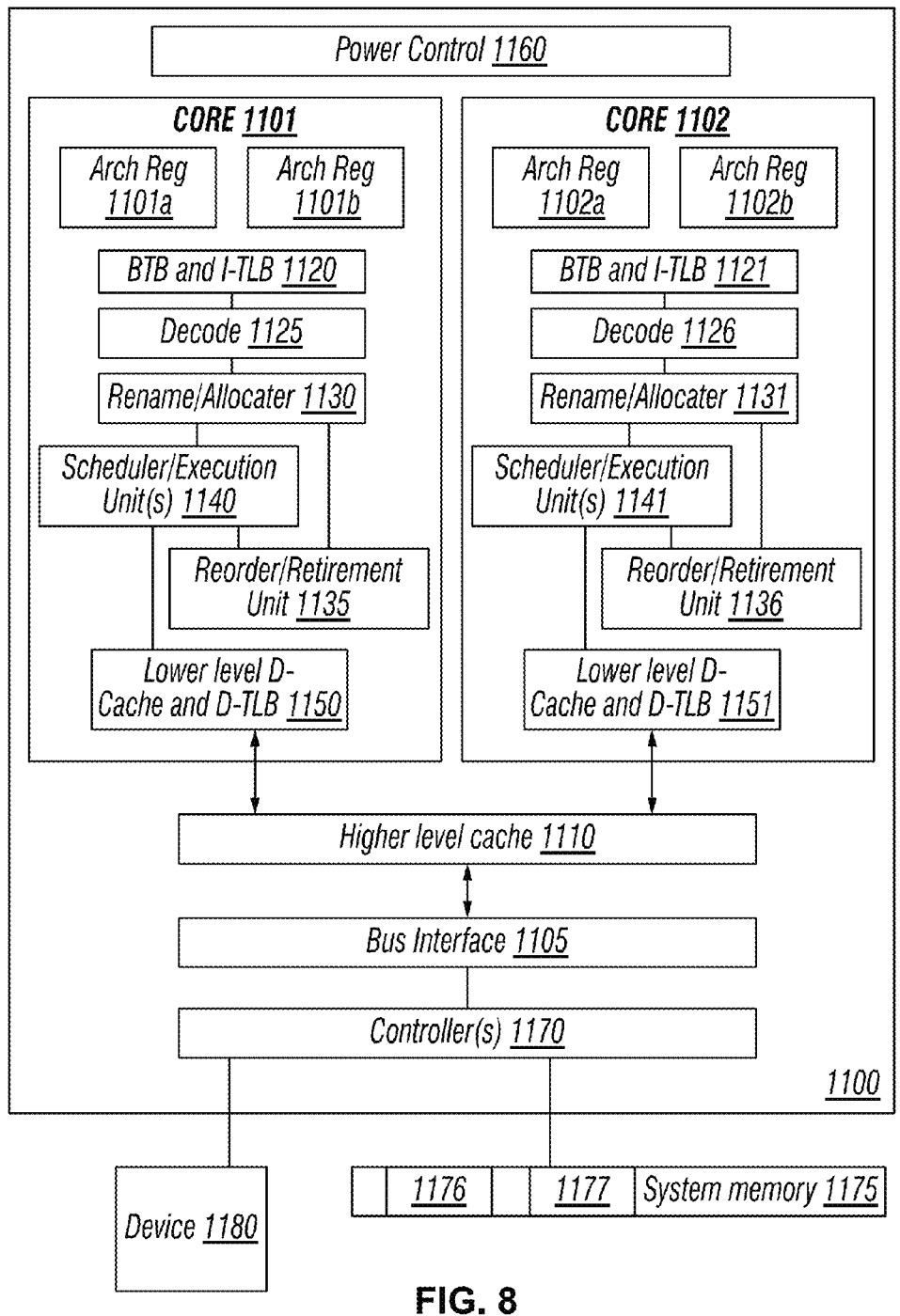
FIG. 8 is an embodiment of a processor including multiple cores.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SoC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power management in accordance with an embodiment of the present invention. In this scenario, bus interface 1105 is to communicate with devices external to processor 1100, such as system memory and other components.

A memory controller 1170 may interface with other devices such as one or many memories. In an example, bus interface 1105 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 9:
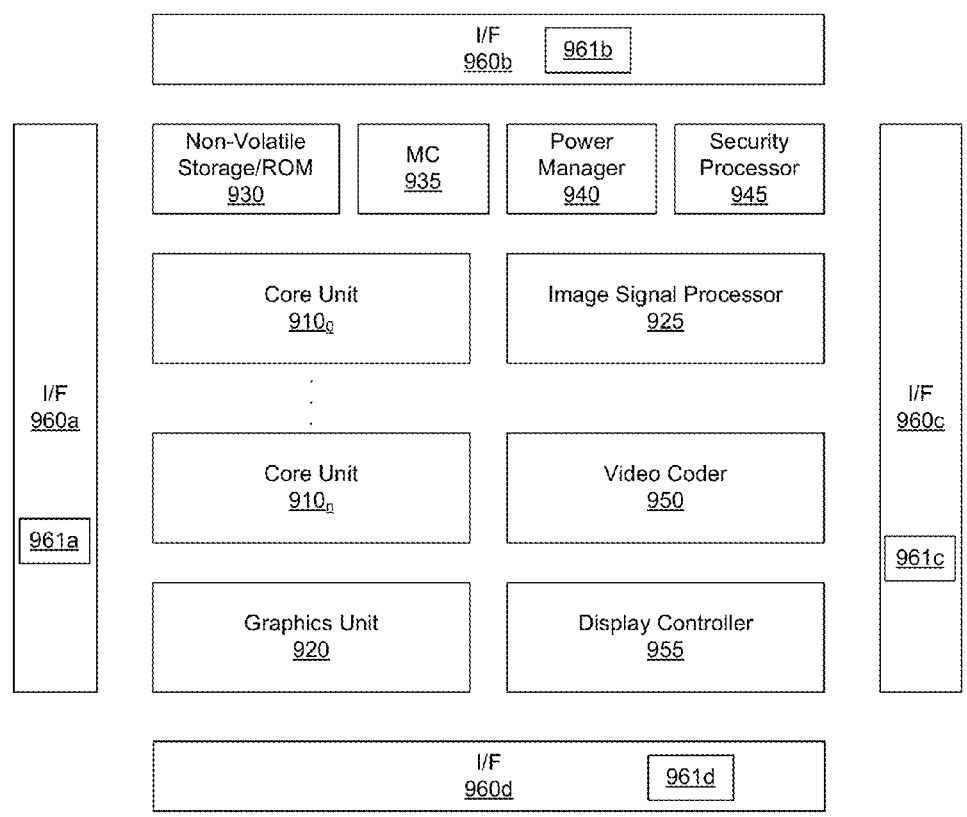
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth. Each of the units may have its power consumption controlled via a power manager 940, which may include control logic to perform various power management techniques.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIPI, SDIO, DDR, SPI, HDMI, among other types of communication protocols. As seen each interface 960 includes a corresponding optimization circuit 961a-961d to dynamically control operating voltage (and/or frequency) of the interface based at least in part on process variation information. Although shown at this high level in the embodiment of FIG. 9, understand the scope of the present invention is not limited in this regard.

Figure 10:
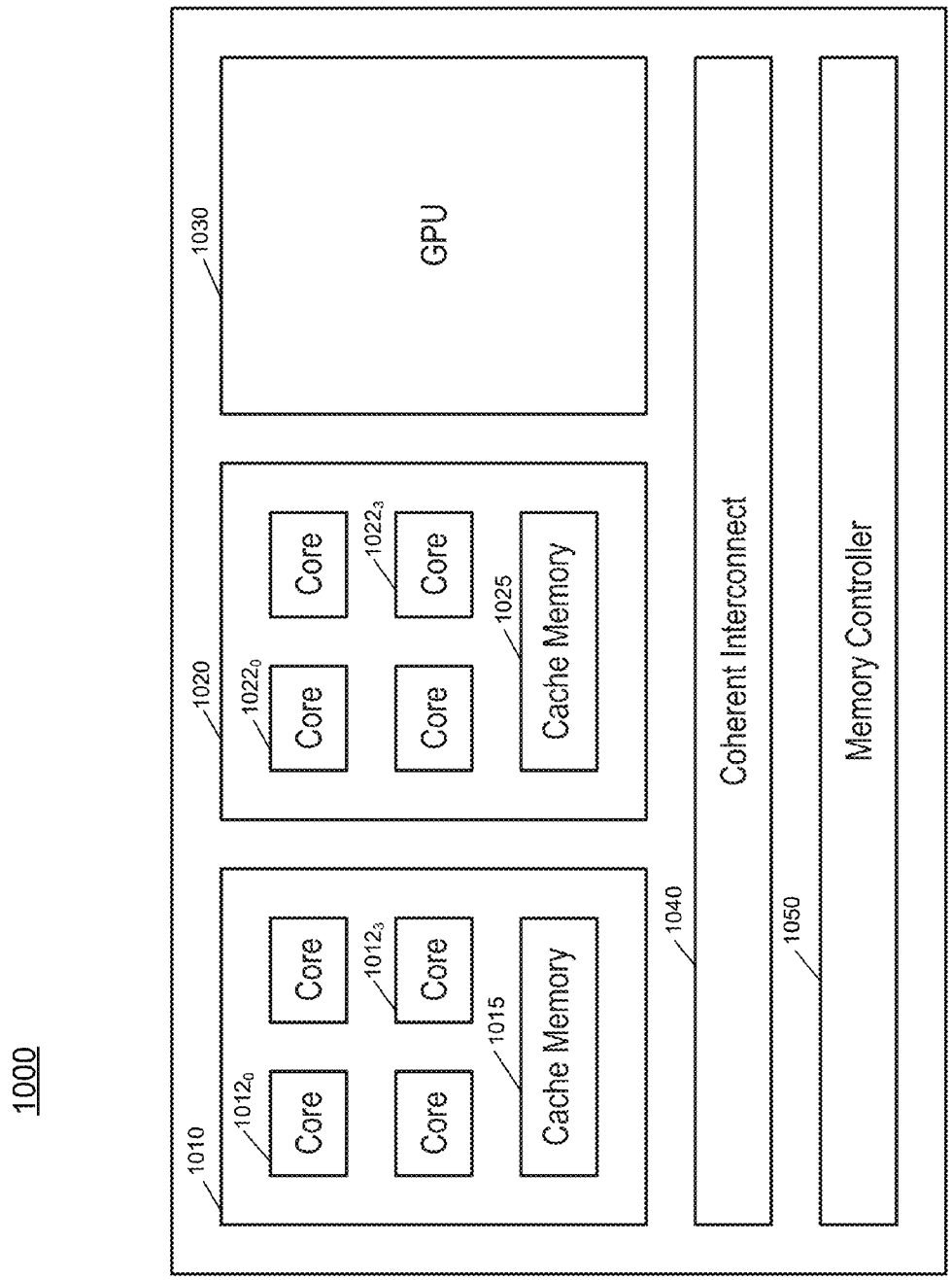
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components (and which may include optimization circuits as described herein).

Figure 11:
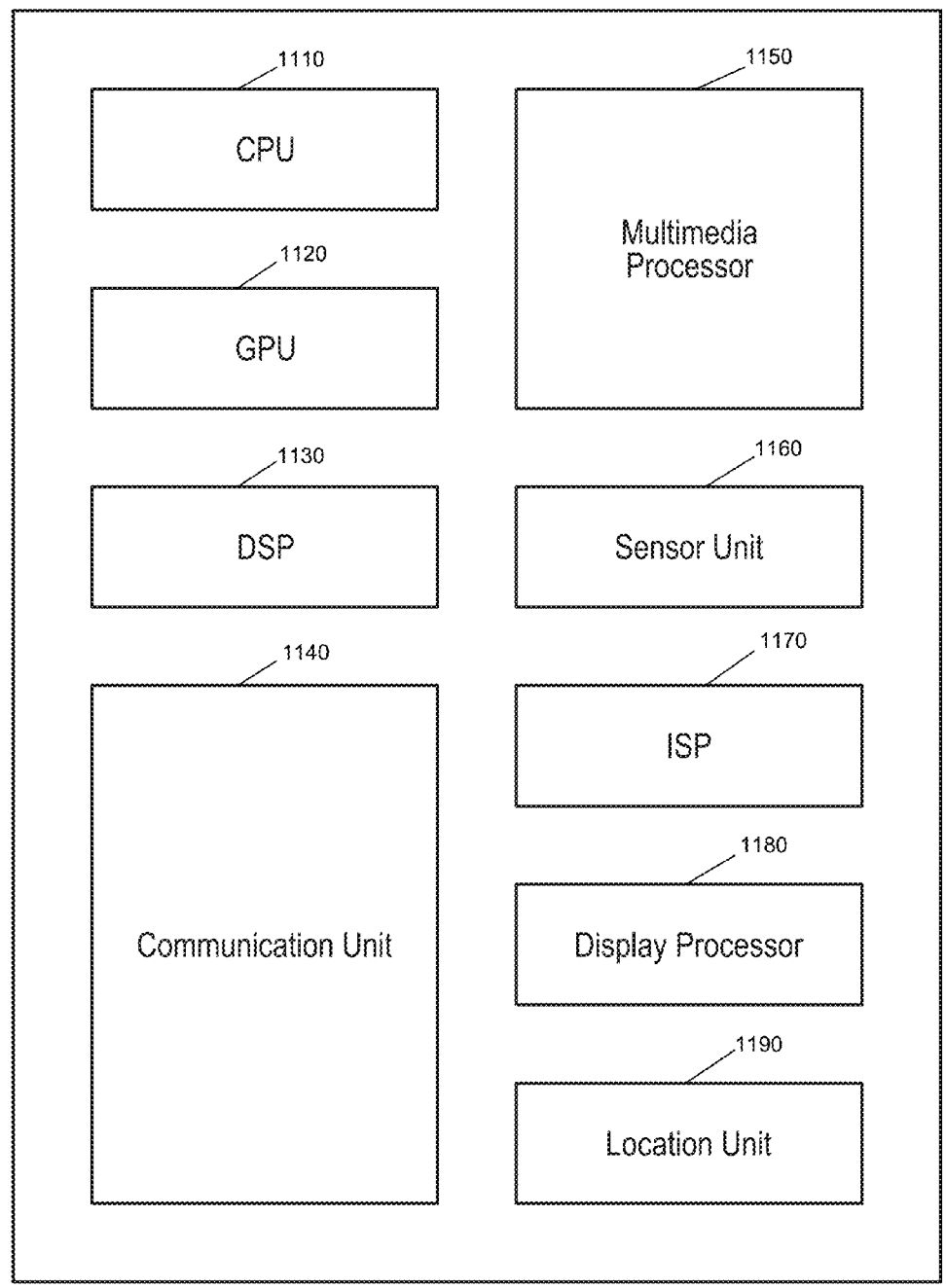
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Interfaces to off-chip components (not shown in FIG. 11) may include optimization circuitry as described herein to perform process variation-based optimizations of voltage and/or other operating characteristics. Understand that while shown with this particular set of components in the example of FIG. 11, many variations and alternatives are possible.

Figure 12:
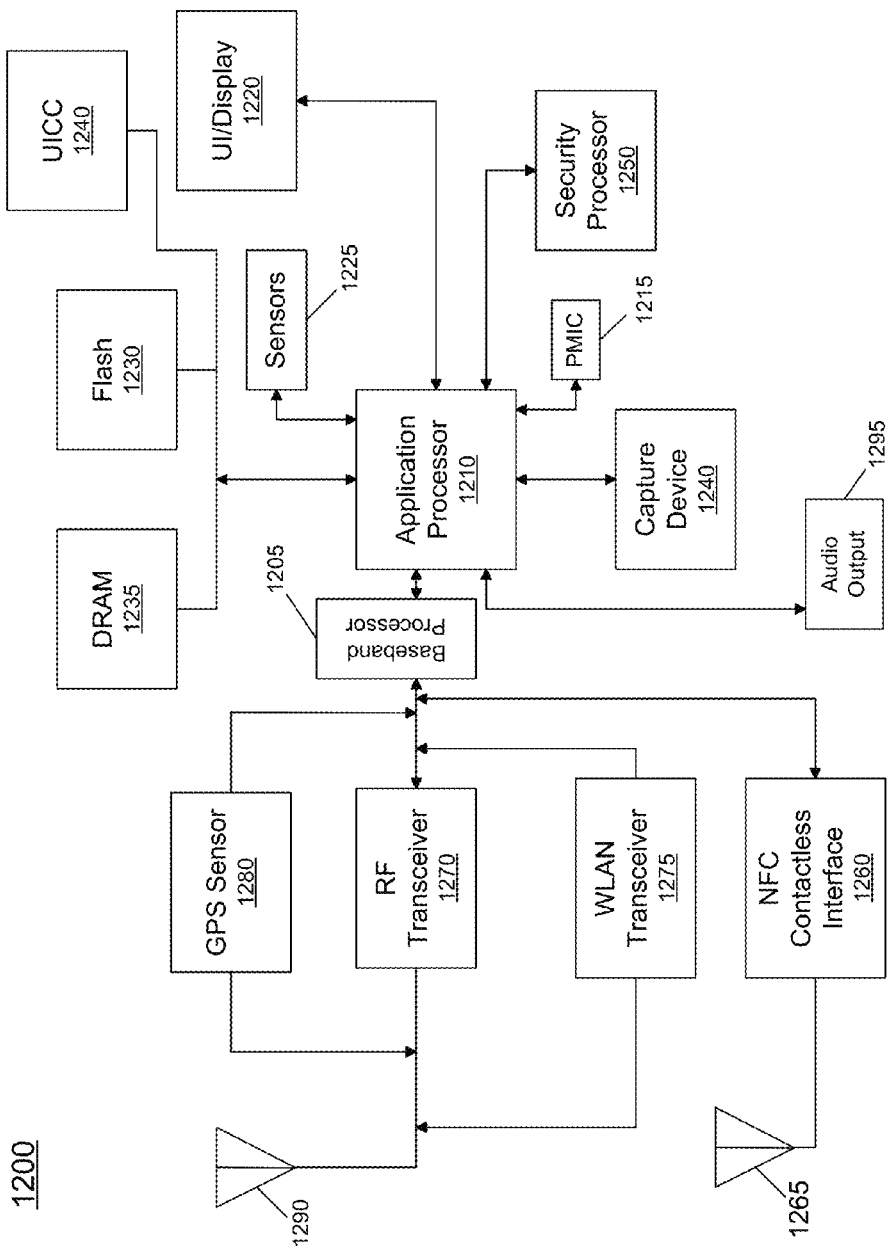
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device, and may include interfaces having optimization circuitry as described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
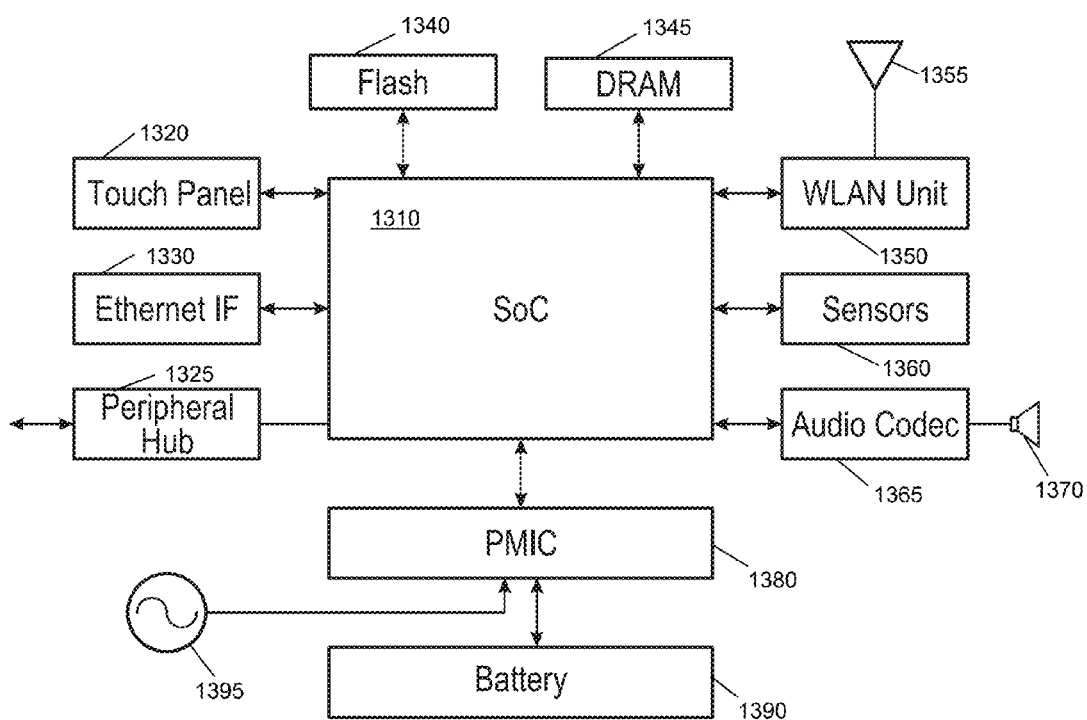
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors. SoC 1310 may include interfaces having optimization circuitry as described herein.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
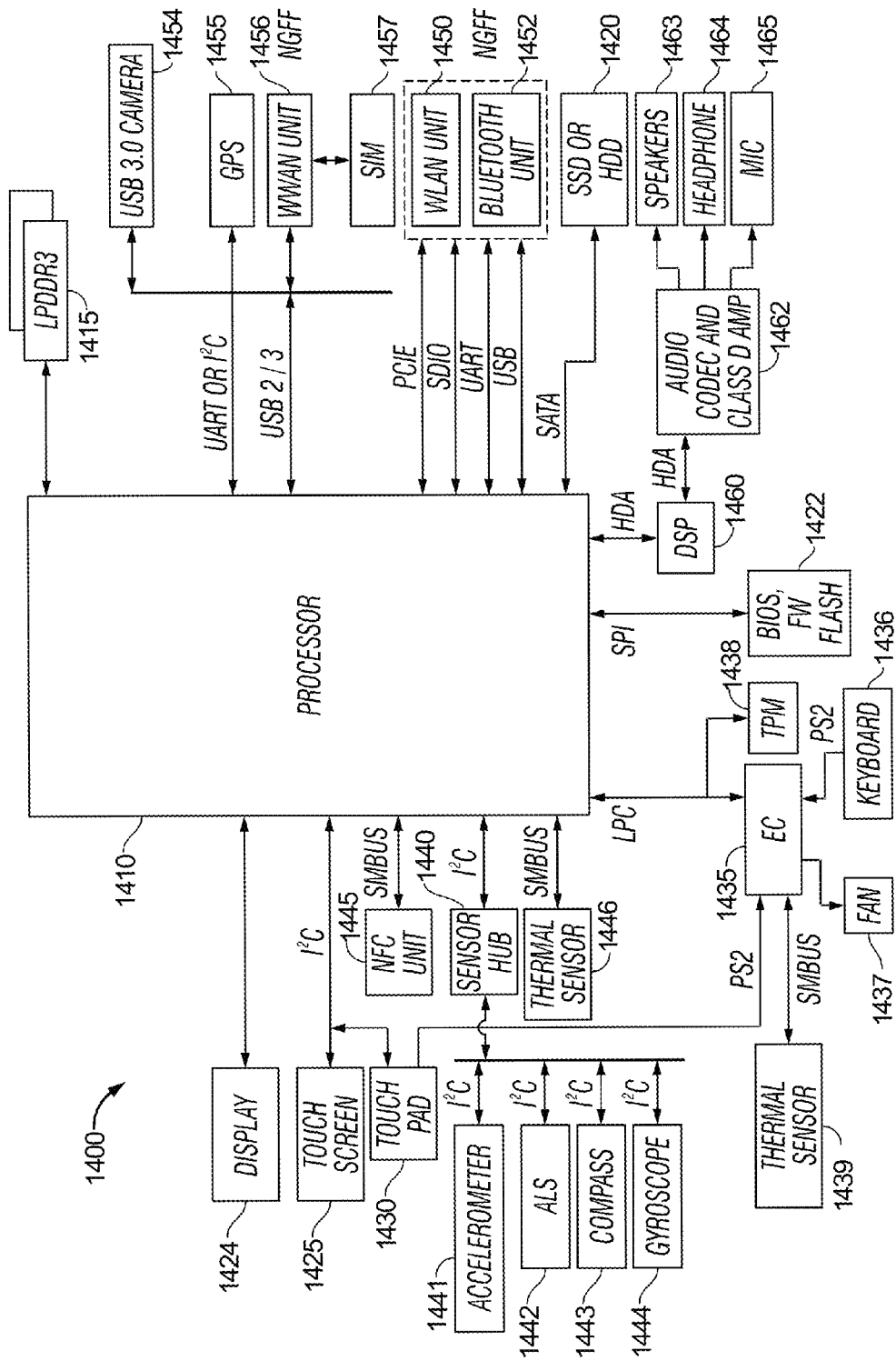
FIG. 14 is a block diagram of a representative computer system.

Referring now to FIG. 14, a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may include interfaces having optimization circuitry as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I²C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
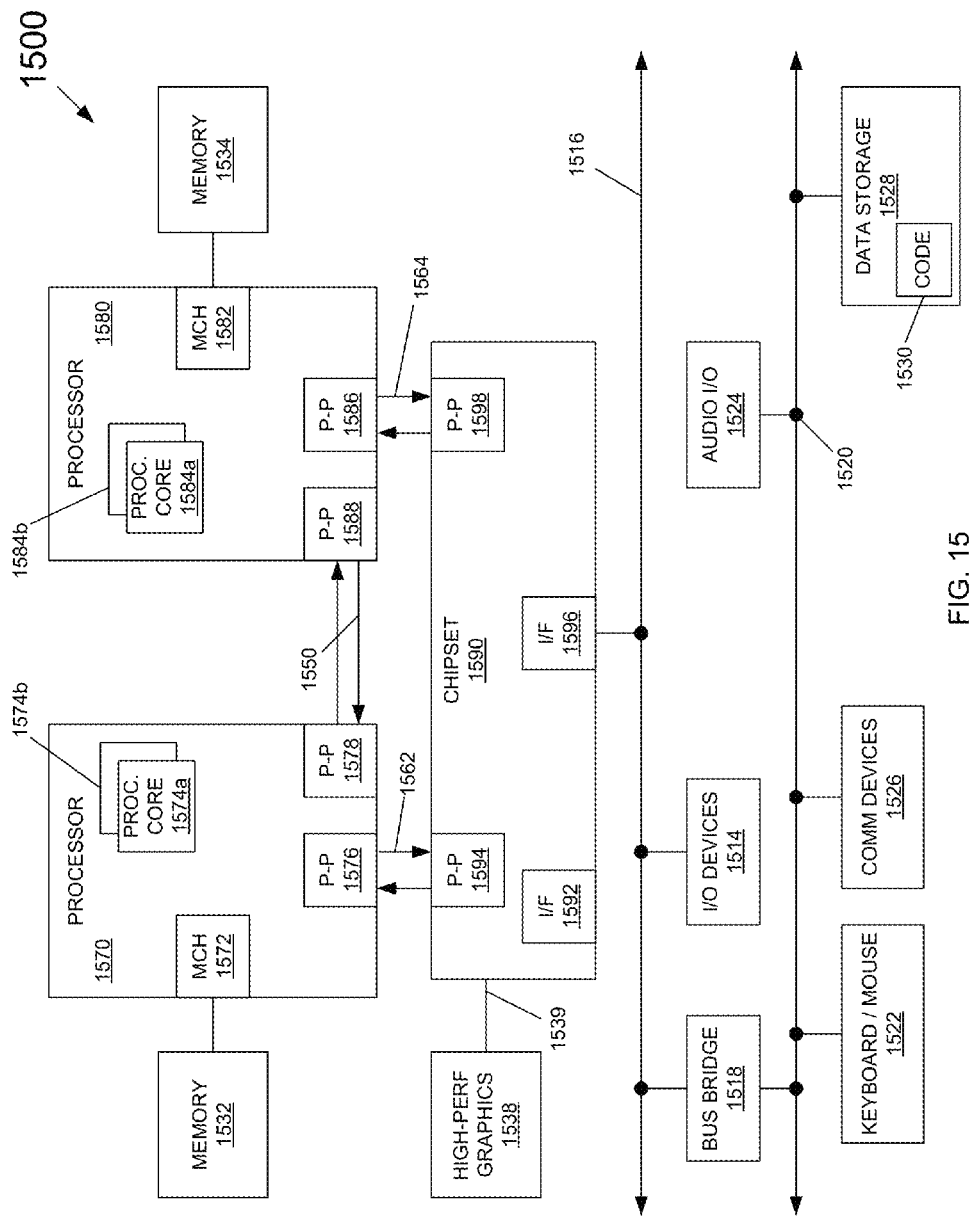
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include an optimization circuit or other such logic to perform dynamic interface operating characteristic adaptation.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following examples pertain to further embodiments.

In one example, a processor comprises: at least one logic circuit to generate information to be output from the processor; an IO interface circuit coupled to the at least one logic circuit to receive and transmit the information; a voltage regulator to provide an operating voltage to the IO interface circuit; and a controller to control the voltage regulator to provide the operating voltage at an adjusted level from a nominal operating voltage based on a process variation of at least a portion of a die including the IO interface circuit.

In an example, the processor further includes a monitor logic to determine the process variation, where the monitor logic is to provide an indication of a level of the process variation to the controller.

In an example, the controller is to receive the indication and determine the adjusted level for the operating voltage based at least in part on the indication.

In an example, the processor further includes a voltage detection circuit to receive the operating voltage from the voltage regulator and to provide a measure of the operating voltage to the controller.

In an example, the controller is to receive a nominal operating voltage value for the voltage regulator and the indication of the process variation level, and responsive thereto to cause the voltage regulator to provide the operating voltage at the adjusted level.

In an example, the IO interface circuit comprises a driver to receive the information from the at least one logic circuit and output a signal stream including the information from the processor.

In an example, the IO interface circuit further comprises a loop back receiver circuit coupled to the driver to receive the signal stream and, in a test mode, to output the signal stream to a test logic, where the test logic is to compare the signal stream with a test stream and output a test result signal to the controller.

In an example, the IO interface circuit comprises a physical coding sublayer to receive and code the information, a transmitter digital circuit coupled to the physical coding sublayer to process the coded information and output the processed coded information to the driver.

In an example, the controller is to throttle power consumption of the IO interface circuit responsive to the process variation being above a nominal level.

In an example, the controller is to increase performance of the IO interface circuit responsive to the process variation being below the nominal level.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: powering up an IO circuit of an integrated circuit and receiving an indication of a process variation of the IO circuit; responsive to the indication being of a first level to indicate a fast process variation, controlling a voltage regulator to provide an operating voltage to the IO circuit at less than a first nominal voltage; and responsive to the indication being of a second level to indicate a slow process variation, controlling the voltage regulator to provide the operating voltage to the IO circuit at greater than a second nominal voltage, the second nominal voltage greater than the first nominal voltage.

In an example, the method further comprises: responsive to the indication being of the first level, determining whether loop back information received from an output of the IO circuit corresponds to test information provided to the IO circuit, and if so, iteratively reducing the operating voltage until the loop back information does not correspond to the test information or the operating voltage reaches a first minimum threshold voltage; and thereafter controlling the voltage regulator to provide the operating voltage to the IO circuit at the reduced operating voltage at which the loop back information last corresponded to the test information.

In an example, the method further comprises reducing the operating voltage by a first amount per each iteration of the iterative operating voltage reduction.

In an example, the method further comprises: responsive to the indication being of the second level, determining whether loop back information received from an output of the IO circuit corresponds to test information provided to the IO circuit, and if so, iteratively increasing the operating voltage until the loop back information does not correspond to the test information or the operating voltage reaches a second maximum threshold voltage; and thereafter controlling the voltage regulator to provide the operating voltage to the IO circuit at the increased operating voltage at which the loop back information last corresponded to the test information.

In an example, the method further includes: responsive to power up of a plurality of other IO circuits of the integrated circuit, independently controlling a plurality of voltage regulators each associated with one of the plurality of other IO circuits, based on a process variation of the corresponding IO circuit.

In another example, a computer readable medium including instructions is to perform the method of any of the above examples.

In another example, an apparatus comprises means for performing the method of any one of the above examples.

In a still further example, a system includes a processor having: at least one core to execute instructions; at least one graphics processor to process video data; and a first IO interface circuit coupled to the at least one graphics processor to output the processed video data. In an example, the first IO interface circuit includes: a transmitter path to drive the processed video data to one or more output pads of the processor; a receiver path to receive information from one or more input pads of the processor; a first voltage regulator to provide a first operating voltage to the first IO interface circuit; a process monitor, during runtime, to determine a process variation of the first IO interface circuit; and a controller to control the first voltage regulator to provide the first operating voltage at an adjusted level, during the runtime, based at least in part on the determined process variation. The system may further include an external voltage regulator to provide a regulated voltage to the first voltage regulator.

In an example, the controller is to cause the first voltage regulator to throttle the first operating voltage when the process variation is determined to be higher than a nominal level and to cause the first voltage regulator to increase the first operating voltage when the process variation is determined to be less than a nominal level.

In an example, the process monitor comprises a first storage to store set points for a plurality of process variation levels and a second storage to store a coded indication of the determined process variation.

In an example, the process monitor is to update the set points of the first storage responsive to an override input.

In an example, the controller is to iteratively adjust the adjusted level of the first operating voltage until loop back information received from an output of the first IO interface circuit does not correspond to test information provided to the first IO interface circuit, and thereafter cause the first voltage regulator to provide the first operating voltage at the adjusted level at which the loop back information last corresponded to the test information.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one logic circuit to generate information to be output from the processor;
   an input/output (IO) interface circuit coupled to the at least one logic circuit to receive and transmit the information, the IO interface circuit comprising:
      a driver to receive the information from the at least one logic circuit and output a signal stream including the information from the processor; and
      a loop back receiver circuit coupled to the driver to receive the signal stream to be transmitted from the processor and, in a test mode to perform a near end loop back test, to output the signal stream to a test logic, wherein the test logic is to compare the signal stream with a test stream and output a test result signal to a controller;
   a voltage regulator to provide an operating voltage to the IO interface circuit;
   the controller to control the voltage regulator to provide the operating voltage at an adjusted level from a nominal operating voltage based on a process variation of at least a portion of a die including the IO interface circuit, wherein the controller is to control the voltage regulator to iteratively adjust the operating voltage during the near end loop back test until the signal stream does not correspond to the test stream, and thereafter control the voltage regulator to provide the operating voltage at an adjusted level at which the signal stream last corresponded to the test stream; and
   a process monitor circuit to determine the process variation, wherein the process monitor circuit is to provide an indication of a level of the process variation to the controller, the process monitor circuit separate from the IO interface circuit.

2. The processor of claim 1, wherein the controller is to receive the indication and determine the adjusted level for the operating voltage based at least in part on the indication.

3. The processor of claim 2, further comprising a voltage detection circuit to receive the operating voltage from the voltage regulator and to provide a measure of the operating voltage to the controller.

4. The processor of claim 2, wherein the controller is to receive a nominal operating voltage value for the voltage regulator and the indication of the process variation level, and responsive thereto to cause the voltage regulator to provide the operating voltage at the adjusted level.

5. The processor of claim 1, wherein the IO interface circuit comprises a physical coding sublayer to receive and code the information, a transmitter digital circuit coupled to the physical coding sublayer to process the coded information and output the processed coded information to the driver.

6. The processor of claim 1, wherein the controller is to throttle power consumption of the IO interface circuit responsive to the process variation being above a nominal level.

7. The processor of claim 6, wherein the controller is to increase performance of the IO interface circuit responsive to the process variation being below the nominal level.

8. The processor of claim 1, wherein the process monitor circuit comprises a first storage to store set points for a plurality of process variation levels and a second storage to store a coded indication of the determined process variation.

9. The processor of claim 8, wherein the controller is to control the voltage regulator according to the coded indication.

10. A non-transitory machine-readable medium having stored thereon instructions, which if performed by a machine cause the machine to perform a method comprising:

powering up an input/output (IO) circuit of an integrated circuit and receiving an indication of a process variation of the IO circuit;

responsive to the indication being of a first level to indicate a fast process variation, controlling a voltage regulator to provide an operating voltage to the IO circuit at less than a first nominal voltage;

responsive to the indication being of a second level to indicate a slow process variation, controlling the voltage regulator to provide the operating voltage to the IO circuit at greater than a second nominal voltage, the second nominal voltage greater than the first nominal voltage; and after controlling the voltage regulator to provide the operating voltage responsive to the indication being of the first level or the second level, controlling the voltage regulator to provide the operating voltage to the IO circuit at a varying level to perform near end loop back testing to optimize the operating voltage, including responsive to the indication being of the second level, determining whether loop back information of the near end loop back testing received from an output of the IO circuit corresponds to test information provided to the IO circuit, and if so, iteratively increasing the operating voltage until the loop back information does not correspond to the test information or the operating voltage reaches a second maximum threshold voltage, and thereafter controlling the voltage regulator to provide the operating voltage to the IO circuit at the increased operating voltage at which the loop back information last corresponded to the test information.

11. The non-transitory machine-readable medium of claim 10, wherein the method further comprises:

responsive to the indication being of the first level, determining whether loop back information of the near end loop back testing received from an output of the IO circuit corresponds to test information provided to the IO circuit, and if so, iteratively reducing the operating voltage until the loop back information does not correspond to the test information or the operating voltage reaches a first minimum threshold voltage; and thereafter controlling the voltage regulator to provide the operating voltage to the IO circuit at the reduced operating voltage at which the loop back information last corresponded to the test information.

12. The non-transitory machine-readable medium of claim 11, wherein the method further comprises reducing the operating voltage by a first amount per each iteration of the iterative operating voltage reduction.

13. The non-transitory machine-readable medium of claim 10, wherein the method further comprises:

responsive to power up of a plurality of other IO circuits of the integrated circuit, independently controlling a plurality of voltage regulators each associated with one of the plurality of other IO circuits, based on a process variation of the corresponding IO circuit.

14. A system comprising:

a processor comprising:
   at least one core to execute instructions;
   at least one graphics processor to process video data;
   a first input/output (IO) interface circuit coupled to the at least one graphics processor to output the processed video data, the first IO interface circuit including:
      a transmitter path to drive the processed video data to one or more output pads of the processor;
      a receiver path to receive information from one or more input pads of the processor;
      a first voltage regulator to provide a first operating voltage to the first IO interface circuit;
      a process monitor, during runtime, to determine a process variation of a portion of a die including the first IO interface circuit, wherein the process monitor comprises a first storage to store set points for a plurality of process variation levels and a second storage to store a coded indication of the determined process variation; and
      a controller to control the first voltage regulator to provide the first operating voltage at a first adjusted level, during the runtime, based at least in part on the coded indication of the determined process variation, and after the first voltage regulator is to provide the first operating voltage at the first adjusted level, the controller is to iteratively adjust the adjusted level of the first operating voltage until near end loop back information received from an output of the first IO interface circuit does not correspond to test information provided to the first IO interface circuit, and thereafter cause the first voltage regulator to provide the first operating voltage at the adjusted level at which the loop back information last corresponded to the test information; and an external voltage regulator to provide a regulated voltage to the first voltage regulator.

15. The system of claim 14, wherein the controller is to cause the first voltage regulator to throttle the first operating voltage when the process variation is determined to be higher than a nominal level and to cause the first voltage regulator to increase the first operating voltage when the process variation is determined to be less than the nominal level.

16. The system of claim 14, wherein the process monitor is to update the set points of the first storage responsive to an override input.

\* \* \* \* \*